(12) United States Patent
McCay et al.

(10) Patent No.: US 6,497,985 B2
(45) Date of Patent: *Dec. 24, 2002

(54) METHOD FOR MARKING STEEL AND ALUMINUM ALLOYS

(75) Inventors: Mary Helen McCay, Monteagle, TN (US); T. Dwayne McCay, Monteagle, TN (US); John A. Hopkins, Tullahoma, TN (US); Narendra B. Dahotre, Tullahoma, TN (US); C. Michael Sharp, Belvidere, TN (US); John Brice Bible, South Pittsburg, TN (US); Frederick A. Schwartz, Woodbury, TN (US)

(73) Assignee: University of Tennessee Research Corporation, Knoxville, TN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/328,807

(22) Filed: Jun. 9, 1999

(65) Prior Publication Data

US 2001/0036587 A1 Nov. 1, 2001

(51) Int. Cl.[7] ................................................ B23K 26/00
(52) U.S. Cl. .................. 430/198; 430/945; 219/121.65; 219/121.61; 219/121.66; 219/121.8; 427/229; 427/376.4; 427/376.3; 427/554; 427/556; 427/597
(58) Field of Search ................................. 430/945, 198; 427/229, 376.4, 376.3, 556, 554, 555, 559, 596, 597; 219/121.65, 121.66, 121.61, 121.8

(56) References Cited

U.S. PATENT DOCUMENTS

| 3,705,758 A | 12/1972 | Haskal ........................ 346/108 |
| 3,848,104 A | 11/1974 | Locke ..................... 219/121 L |

(List continued on next page.)

FOREIGN PATENT DOCUMENTS

| DE | 2129926 | * | 6/1971 | ................. 427/556 |
| EP | 876870 A1 | | 4/1998 | |
| JP | 49-41084 B | * | 11/1974 | |
| JP | 59-033094 | * | 2/1984 | |
| JP | 60-172590 | * | 9/1985 | ................. 427/556 |
| JP | 61-195893 | * | 8/1986 | ................. 427/596 |
| JP | 61-210189 | * | 9/1986 | |
| JP | 63-278692 | | 11/1988 | |
| JP | 401083676 A | | 3/1989 | |
| JP | 381082 | | 4/1991 | |
| JP | 3115587 A | | 5/1991 | |
| JP | 403115531 A | | 5/1991 | |
| JP | 05-285686 | | 11/1993 | |
| JP | 06-173031 | * | 6/1994 | |
| SU | 398706 | * | 3/1974 | |
| SU | 1557193 | | 4/1990 | |
| SU | 1743770 | | 6/1992 | |
| WO | WO 95/21720 | | 8/1995 | |
| WO | WO 97/47397 | | 12/1997 | |

OTHER PUBLICATIONS

ASM Handbook, vol. 6, Welding, Brazing, and Soldering, 1993.

(List continued on next page.)

*Primary Examiner*—Martin Angebranndt

(57) ABSTRACT

The present invention relates to a method for marking metallic alloys using laser alloying. Specifically, the present invention is directed toward the use of laser alloying steel or aluminum alloys with a mark that provides protection against wear and corrosion and greater permanency.

15 Claims, 3 Drawing Sheets

U.S. PATENT DOCUMENTS

| | | | |
|---|---|---|---|
| 3,986,767 A | 10/1976 | Rexer et al. | 350/299 |
| 4,015,100 A | 3/1977 | Gnanamuthu et al. | 219/121 LM |
| 4,017,708 A | 4/1977 | Engel et al. | 219/121 LM |
| 4,157,923 A * | 6/1979 | Yen et al. | 427/53 |
| 4,212,900 A | 7/1980 | Serlin | 427/53.1 |
| 4,322,601 A | 3/1982 | Serlin | 219/121 L |
| 4,323,755 A * | 4/1982 | Nierenberg | 219/121 LJ |
| 4,434,189 A | 2/1984 | Zaplatynsky | 427/53.1 |
| 4,475,027 A | 10/1984 | Pressley | 219/121 L |
| 4,480,169 A | 10/1984 | Macken et al. | 219/121 LH |
| 4,495,255 A | 1/1985 | Draper et al. | 428/667 |
| 4,535,218 A | 8/1985 | Krause et al. | 219/212 LH |
| 4,617,070 A | 10/1986 | Amende et al. | 148/152 |
| 4,638,163 A | 1/1987 | Braunlich et al. | 250/354.1 |
| 4,644,127 A | 2/1987 | La Rocca | 219/121 FS |
| 4,720,312 A | 1/1988 | Fukuizumi et al. | 148/152 |
| 4,724,299 A | 2/1988 | Hammeke | 219/121 L |
| 4,746,540 A | 5/1988 | Kawasaki et al. | 427/53.1 |
| 4,750,947 A * | 6/1988 | Yoshiwara et al. | 148/13 |
| 4,801,352 A | 1/1989 | Piwczyk | 156/643 |
| 4,839,518 A | 6/1989 | Braunlich et al. | 250/337 |
| 4,847,112 A * | 7/1989 | Halleux | 219/121.68 |
| 4,898,650 A | 2/1990 | Wu et al. | 204/29 |
| 4,904,498 A | 2/1990 | Wu | 427/53.1 |
| 4,964,967 A | 10/1990 | Hashimoto et al. | 204/212 |
| 4,981,716 A | 1/1991 | Sundstrom | 421/53.1 |
| 4,998,005 A | 3/1991 | Rathi et al. | 219/121.83 |
| 5,059,013 A | 10/1991 | Jain | 359/503 |
| 5,095,386 A | 3/1992 | Scheibengraber | 359/668 |
| 5,124,993 A | 6/1992 | Braunlich et al. | 372/31 |
| 5,130,172 A | 7/1992 | Hicks et al. | 427/252 |
| 5,147,999 A | 9/1992 | Dekumbis et al. | 219/121.63 |
| 5,196,672 A | 3/1993 | Matsuyama et al. | 219/121.83 |
| 5,208,431 A | 5/1993 | Uchiyama et al. | 219/121.65 |
| 5,230,755 A | 7/1993 | Pierantoni et al. | 148/516 |
| 5,247,155 A | 9/1993 | Steen et al. | 219/121.83 |
| 5,257,274 A | 10/1993 | Barrett et al. | 372/20 |
| 5,265,114 A | 11/1993 | Sun et al. | 372/69 |
| 5,267,013 A | 11/1993 | Spence | 356/121 |
| 5,290,368 A | 3/1994 | Gavigan et al. | 148/212 |
| 5,308,431 A | 5/1994 | Maher et al. | 156/345 |
| 5,314,003 A | 5/1994 | Mackay | 164/494 |
| 5,319,195 A | 6/1994 | Jones et al. | 250/227.11 |
| 5,322,436 A | 6/1994 | Horng et al. | 433/23 |
| 5,331,466 A | 7/1994 | Van Saarloos | 359/723 |
| 5,352,538 A | 10/1994 | Takeda et al. | 428/553 |
| 5,387,292 A | 2/1995 | Morishige et al. | 148/276 |
| 5,406,042 A | 4/1995 | Engelfriet et al. | 219/121.68 |
| 5,409,741 A | 4/1995 | Laude | 427/555 |
| 5,409,742 A | 4/1995 | Arfsten et al. | |
| 5,411,770 A | 5/1995 | Tsai et al. | 427/550 |
| 5,430,270 A | 7/1995 | Findlan et al. | 219/121.63 |
| 5,446,258 A | 8/1995 | Mordike | 219/121.66 |
| 5,449,536 A | 9/1995 | Funkhouser et al. | 427/597 |
| 5,466,906 A | 11/1995 | McCune, Jr. et al. | 219/121.59 |
| 5,484,980 A | 1/1996 | Pratt et al. | 219/121.66 |
| 5,486,677 A | 1/1996 | Maischner et al. | 219/121.83 |
| 5,491,317 A | 2/1996 | Pirl | 219/121.64 |
| 5,514,849 A | 5/1996 | Findlan et al. | 219/121.63 |
| 5,530,221 A | 6/1996 | Benda et al. | 219/121.83 |
| 5,546,214 A | 8/1996 | Black et al. | 359/203 |
| 5,558,788 A * | 9/1996 | Mashburn | 219/121.68 |
| 5,563,095 A | 10/1996 | Frey | 437/141 |
| 5,599,590 A * | 2/1997 | Hayashi et al. | 427/448 |
| 5,614,114 A | 3/1997 | Owen | 219/121.66 |
| 5,643,641 A | 7/1997 | Turchan et al. | 427/595 |
| 5,659,479 A | 8/1997 | Duley et al. | 364/474.08 |
| 5,874,011 A | 2/1999 | Ehrlich | 216/65 |
| 6,051,448 A * | 4/2000 | Hayama et al. | 438/108 |
| 6,075,223 A * | 6/2000 | Harrison | 219/121.85 |
| 6,284,067 B1 * | 9/2001 | Schwartz et al. | 148/525 |

OTHER PUBLICATIONS

Ayers, et al.; "A Laser Processing Technique for Improving the Wear Resistance of Metals," *Journal of Metals*, Aug. 1981, 19–23.

Belvaux, et al.; "A Method for Obtaining a Uniform Non–Gaussian Laser Illumination," *Optics Communications*, vol. 15, No. 2, Oct. 1975, 193–195.

Bett, et al.; "Binary phase zone–plate arrays for laser–beam spatial–intensity distribution conversion," *Applied Optics*, vol. 34, No. 20, Jul. 10, 1995, 4025–4036.

Bewsher, et al.; "Design of single–element laser–beam shape projectors," *Applied Optics*, vol. 35, No. 10, Apr. 1, 1996, 1654–1658.

Breinan, et al.; "Processing material with lasers," *Physics Today*, Nov. 1976, 44–50.

Bruno, et al.; "Laserbeam Shaping for Maximum Uniformity and Maximum Loss, A Novel Mirror Arrangement Folds the Lobes of a Multimode Laserbeam Back onto its Center," *Lasers & Applications*, Apr. 1987, 91–94.

Chen, et al.; "The Use of a Kaleidoscope to Obtain Uniform Flux Over a Large Area in a Solar or Arc Imaging Furnace," *Applied Optics*, vol. 2, No. 3, Mar. 1963, 265–571.

Christodoulou, et al.; "Laser surface melting of some alloy steels," *Metals Technology*, Jun. 1983, vol. 10, 215–222.

Cullis, et al.; "A device for laser beam diffusion and homogenisation," *J. Phys.E:Sci. Instrum.*, vol. 12, 1979, 668–689.

Dahotre, et al., "Development of microstructure in laser surface alloying of steel with chromium," *Journal of Materials Science*, vol. 25, 1990, 445–454.

Dahotre, et al., "Laser Surface Melting and Alloying of Steel with Chromium," *Laser Material Processing III*, 1989, 3–19.

Fernelius, et al.; "Design and Testing of a Refractive Laser Beam Homogenizer," *Airforce Writing Aeronautical Laboratories Report*, (AFWAL–TR–84–4042), Sep. 1984, 46 pages.

Frieden; "Lossless Conversion of a Plane Laser Wave to a Plane Wave of Uniform Irradiance," *Applied Optics*, vol. 4, No. 11, Nov. 1965, 1400–1403.

Galletti, et al.; "Transverse–mode selection in apertured super–Gaussian resonators: an experimental and numerical investigation for a pulsed $CO_2$ Doppler lidar transmitter," *Applied Optics*, vol. 36, No. 6, Feb. 20, 1997, 1269–1277.

Gori, et al.; "Shape–invariance range of a light beam," *Optics Letters*, vol. 21, No. 16, Aug. 15, 1996, 1205–1207.

Grojean, et al.; "Production of flat top beam profiles for high energy lasers," *Rev. Sci. Instrum.* 51(3), Mar. 1980, 375–376.

Hella, "Material Processing with High Power Lasers," *Optical Engineering*, vol. 17, No. 3, May–Jun. 1978, 198–201.

Ignatiev, et al.; "Real–time pyrometry in laser machining," *Measurement and Science Technology*, vol. 5, No. 5, 563–573.

"Laser Removing of Lead–Based Paint" Illinois Department of Transportation, Jun. 1992, 26 pages.

Charschan, "Lasers in industry," *Laser Processing Fundamentals*, (Van Nostrand Reinhold Company), Chapter 3, Sec. 3–1, 139–145.

Fernelius, et al; "Calculations Used in the Design of a Refractive Laser Beam Homogenizer," *Airforce Writing Aeronautical Laboratories Report*, (AFWAL–TR–84–4047), Aug. 1984, 18 pages.

Jain, et al.; "Laser Induced Surface Alloy Formation and Diffusion of Antimony in Aluminum," *Nuclear Instruments and Method*, vol. 168, 275–282, 1980.

Molian; "Estimation of cooling rates in laser surface alloying processes," Journal of Materials Science Letters, vol. 4, 1985, 265–267.

"High Power CW Nd:YAG Laser Transformation Hardening," Hobart Laser Products, 2 pages.

Molian; Structure and hardness of laser–processed Fe–0.2%C–5%Cr and Fe–0.2%C–10%Cr alloys; *Journal of Materials Science*, vol. 20, 1985, 2903–2912.

"Line–Focussing Optics for Multiple–Pass Laser Welding," NASA Tech Briefs MFS–29976, date unknown.

"Cylindrical Lenses," *Newport Technical Guide*, date unknown, N–65.

"Fused Silica Cylindrical Lenses," *Newport Technical Guide,*, date unknown, N–68.

Oswald, et al.; "Measurement and modeling of primary beam shape in an ion microprobe mass analyser," IOP Publishing Ltd., 1990, 255–259.

Renaud, et al., "Surface Alloying of Mild Steel by Laser Melting of an Electroless Nickel Deposit Containing Chromium Carbides," *Materials & Manufacturing Processes*, 6(2), 1991, 315–330.

Smurov, et al.; "Peculiarities of pulse laser alloying: Influence of spatial distribution of the beam," J. Appl. Phys. 71(7), Apr. 1, 1992, 3147–3158.

"Spawr Integrator," Spawr Optical Research, Inc., Data Sheet No. 512, Jun. 1986.

Veldkamp, et al.; "Beam profile shaping for laser radars that use detector arrays," *Applied Optics*, vol. 21, No. 2, Jan. 15, 1982, 345–358.

Veldkamp; "Laser Beam Profile Shaping with Binary Diffraction Gratings," *Optics communications*, vol. 38, No. 5,6, Sep. 1, 1981, 381–386.

Veldkamp; "Laser beam profile shpaing with interlaced binary diffraction gratings," *Applied Optics*, vol. 21, No. 17, Sep. 1, 1982, 3209–3212.

Veldkamp; "Technique for generating focal–plane flattop laser–beam profiles," Rev. Sci. Instru., vol. 53, No. 3, Mar. 1982, 294–297.

Walker, et al.; "Laser surface alloying of iron and 1C–1·4Cr steel with carbon," *Metals Technology*, vol. 11, Sep. 1984, 5 pages.

Walker, et al.; "The laser surface–alloying of iron with carbon," Journal of Material Science vol. 20, 1985, 989–995.

Wei, et al.; "Investigation of High–Intensity Beam Characteristics on Welding Cavity Shape and Temperature Distribution," Journal of Heat Transfer, vol. 112, Feb. 1990, 163–169.

Jones, et al.; "Laser–beam analysis pinpoints critical parameters," *Laser Focus World*, Jan. 1993, 123–130.

Khanna, et al.; "The Effect of Stainless Steel Plasma Coating and Laser Treatment on the Oxidation Resistance of Mild Steel," *Corrosion Science*, vol. 33, No. 6, 1992, 949–958.

"New Products" *Laser Focus World*, Aug. 1996, 173.

Lugscheider, et al.;"A Comparison of the Properties of Coatings Produced by Laser Cladding and Conventional Methods," *Surface Modification Technologies V*, The Institute of Materials, 1992, 383–400.

Manna, et al.; "A One–dimensional Heat Transfer Model for Laser Surface Alloying of Chromium on Copper Substrate," *Department of Metallurgical & Materials Engineering*, Indian Institute of Technology, vol. 86, N. 5, May 1995, 362–364.

Mazille, et al.; "Surface Alloying of Mild Steel by Laser Melting of Nickel and Nickel/Chromium Precoatings," *Materials Performance Maintenance*, Aug. 1991, 71–83.

Molian; "Characterization of Fusion Zone Defects in Laser Surface Alloying Applications," *Scripta Metallurgica*, vol. 17, 1983, 1311–1314.

Molian; "Effect of Fusion Zone Shape on the Composition Uniformity of Laser Surface Alloyed Iron," *Scripta Metallurgica*, vol. 16, 1982, 65–68.

\* cited by examiner

| 10 | APPLYING A LAYER OF PRECURSOR COMPRISING A BINDER AND METALLIC OR CERAMIC POWDER TO A STEEL OR ALUMINUM SUBSTRATE, SAID LAYER HAVING A THICKNESS IN THE RANGE OF 50-75 MICRONS; |

| 12 | IRRADIATING THE SURFACE OF THE SUBSTRATE WITH A LASER BEAM AT A SUFFICIENT ENERGY LEVEL AND FOR A SUFFICIENT TIME TO PRODUCE A CORROSION RESISTANT ALLOYED APRON ON SAID SUBSTRATE WHILE SAID SUBSTRATE IS MOVED RELATIVE TO SAID LASER BEAM; |

| 14 | MARKING THE APRON WITH A LASER BEAM TO PRODUCE A PRESELECTED MARKING ON SAID APRON; AND |

| 15 | DIRECTING A SHIELDING GAS AT THE REGION OF THE SUBSTRATE BEING IRRADIATED BY THE LASER BEAM. |

Figure 1

| 16 | APPLYING A LAYER OF PRECURSOR COMPRISING A BINDER AND METALLIC OR CERAMIC POWDER TO A STEEL OR ALUMINUM SUBSTRATE, SAID LAYER HAVING A THICKNESS IN THE RANGE OF 50-75 MICRONS; AND |

| 18 | IRRADIATING THE SURFACE OF THE SUBSTRATE WITH A LASER BEAM IN A PRESELECTED PATTERN AT A SUFFICIENT ENERGY LEVEL AND FOR A SUFFICIENT TIME TO PRODUCE A CORROSION RESISTANT ALLOYED MARKING ON THE SUBSTRATE. |

*Figure 2*

METHOD FOR MARKING STEEL AND ALUMINUM ALLOYS

BACKGROUND OF THE INVENTION

1. Field of the Invention

The present invention relates to a method for marking metallic alloys using laser alloying. Specifically, the present invention is directed toward the use of laser alloying steel or aluminum alloys with a mark that provides protection against wear and corrosion and greater permanency.

2. Description of the Prior Art

Items made of steel or aluminum have been marked for a variety of reasons including identifying one or more characteristics of the item. One method of marking employs the use of a visible marking substance, such as ink or paint. Such marking substances are subject to fading and/or wear, particularly in abrasive environmental conditions such as wind, rain, and/or direct sunlight. In many cases it is desirable to mark a component prior to the completion of the manufacturing process. It is desirable to have a mark that will not deteriorate during the manufacturing process, which may include heating, bending, abrasion machining and/or welding.

Other methods of marking involve imprinting a visible mark into the surface of an item, such as by etching, engraving, or punching. Methods such as etching or engraving result in some loss of material from the substance to be marked. Methods such as punching result in compression of material, sometimes resulting in a change in the mechanical properties of the material.

The present invention overcomes the drawbacks of the prior art by providing a method of marking steel or aluminum alloys which is far more resistant to wear, abrasion, and fading, and which does not result in a loss of material or in compression of the material to be marked.

SUMMARY OF THE INVENTION

The present invention is directed toward a method for laser marking of metallic alloys. This method comprises applying a layer of precursor comprising a binder and metallic or ceramic powder to a steel or aluminum substrate. The layer has a thickness in the range of 50–250 microns. The method further comprises irradiating the surface of the substrate with a laser beam at a sufficient energy level and for a sufficient time to produce a corrosion and/or wear resistant alloyed apron on the substrate. The laser beam used to perform this step of producing an alloyed apron is referred to herein as the "alloying laser beam." The irradiation is performed while the substrate and the laser beam are moved relative to each other. The method further comprises marking on the apron with the laser beam to produce a preselected marking on the apron. The laser beam used to perform the step of marking the apron is referred to herein as the "marking the laser beam."

DESCRIPTION OF THE FIGURES

FIG. 1 is a block diagram of a first embodiment of the present invention.

FIG. 2 is a block diagram of the second embodiment of the present invention.

DESCRIPTION OF THE PREFERRED EMBODIMENTS

A first embodiment of the present invention is shown in FIG. 1. This method embodiment for laser marking of metallic alloys comprises applying a layer of precursor comprising a binder and metallic or ceramic powder to a metallic substrate, as described in Block 10 of FIG. 1. In a preferred embodiment, the metallic substrate is made from steel or aluminum. The layer has a thickness in the range of 50–250 microns. In a preferred embodiment, the powder comprises chromium. In another preferred embodiment, the powder comprises silicon carbide.

Figure 3:
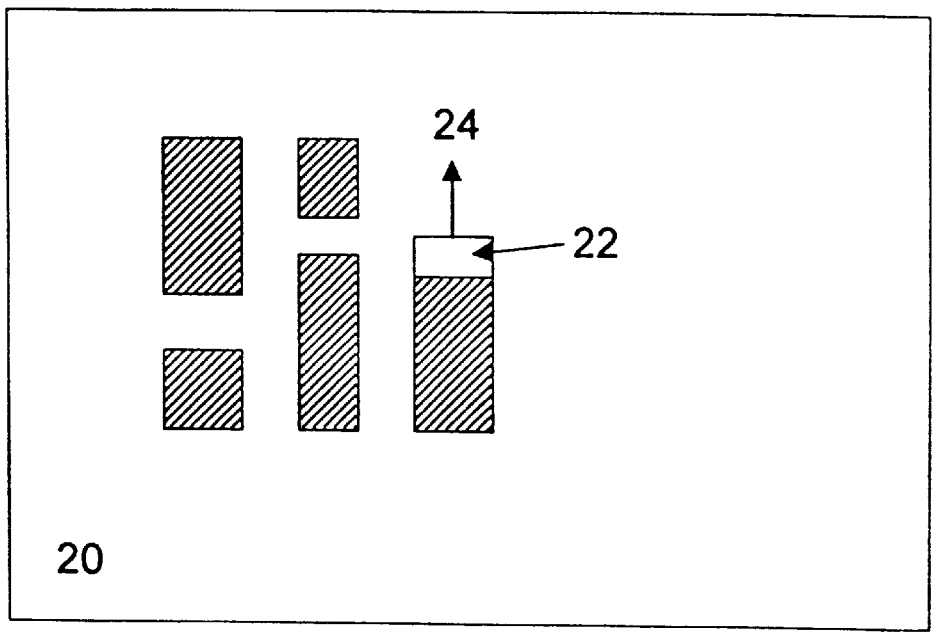
FIG. 3 is a top view of a substrate being marked by the method of the present invention.

The invention further comprises irradiating the surface of the substrate with an alloying laser beam at a sufficient energy level and for a sufficient time to produce a corrosion resistant alloyed apron on the substrate, as shown in Block 12 of FIG. 1. The irradiation takes place while the substrate 20 undergoes relative movement with respect to the laser beam 22 as shown in FIG. 3.

In a preferred embodiment, the substrate 20 is moved relative to the alloying laser beam 22 at a translation rate in the range of 500–9000 millimeters per minute. The direction of movement of the laser beam relative to the substrate is known as the "translation axis" 24, as shown in FIG. 3.

In a preferred embodiment, the irradiating by the alloying laser beam is performed at a laser power density in the range of 45–55 kilowatts/cm$^2$ where the powder comprises chromium and the metallic substrate comprises steel. In another preferred embodiment, where the binder comprises chromium and the substrate comprises steel, the alloying laser beam power density is 50 kilowatts/cm$^2$. In another preferred embodiment, the irradiating is performed with a pulsed laser.

Figure 4:
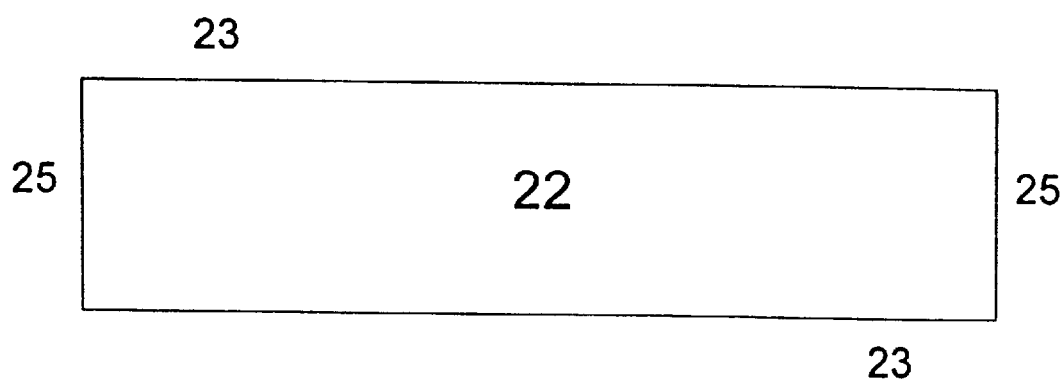
FIG. 4 is an enlarged top view of a laser beam cross section for use in the present invention.

In a preferred embodiment, the alloying laser beam 22 has a rectangular cross sectional area comprising two shorter sides 25 and two longer sides 23, as shown in FIG. 4. In another preferred embodiment, the longer sides of the rectangular cross sectional area have a length of at least four millimeters and the shorter sides of the rectangular cross sectional area have a length of at least 0.6 millimeters. A rectangular beam profile having the dimensions described above can be achieved by aligning a spherical lens closest to the beam, a second cylindrical lens closest to the substrate and a first cylindrical lens between the spherical lens and the second cylindrical lens. The spherical lens should have a focal length of 101.6 millimeters and the first cylindrical lens should have a focal length of 203.2 millimeters. The second cylindrical lens should have a focal length of 152.4 millimeters. The spherical lens and the first cylindrical lens should be spaced apart by five millimeters. The first cylindrical lens and second cylindrical lens should be spaced apart 15 millimeters.

The invention further comprises marking the aprona marking laser beam to produce a preselected marking on the apron, as shown in Block 14 of FIG. 1. In a preferred embodiment, the marking comprises laser etching, as shown in FIG. 3. The present invention encompasses both positive and negative marking. The term "positive marking," as used herein, refers to the laser alloyed region constituting the preselected mark. The term "negative marking," as used herein refers to the unalloyed region constituting the mark. In either case, the pattern traced out by the laser on the substrate defines the preselected pattern of the mark.

In a preferred embodiment, the invention further comprises directing a shielding gas at the region of the substrate being irradiated by the alloying laser beam, as shown in Block 15 of FIG. 1. In a preferred embodiment, the shielding gas is nitrogen or argon.

Another embodiment of the present invention is depicted in FIG. 2. This embodiment comprises applying a layer of precursor comprising a binder in metallic or ceramic powder to a steel or aluminum or substrate, as shown in Block 16 of FIG. 2. The precursor layer has a thickness in the range of 50–75 microns.

This embodiment further comprises irradiating the surface of the substrate with a laser beam in a preselected pattern at a sufficient energy level and for a sufficient time to produce a preselected alloyed marking on the substrate, as described in Block 18 of FIG. 2 and as shown in FIG. 3. The laser alloyed region of the substrate will have increased corrosion and/or wear resistance. In a preferred embodiment, the irradiating is performed with a laser beam having a rectangular cross sectional area comprising two shorter sides and two longer sides, as shown in FIG. 4.

The foregoing disclosure and description of the invention are illustrative and explanatory. Various changes in the size, shape, and materials, as well as in the details of the illustrative construction may be made without departing from the spirit of the invention.

What is claimed is:

1. A method for laser marking of metallic alloys, comprising:
   a. applying a layer of precursor comprising a binder and metallic or ceramic powder to a metallic substrate, said layer having a thickness in the range of 50–250 microns;
   b. irradiating the surface of the substrate with an alloying nonpulsed laser beam at a laser power density of 45–55 kilowatts/cm$^2$ while said substrate is moved relative to said laser beam at a translation rate in the range of 500–9000 millimeters per minute to produce a corrosion resistant alloyed apron on the substrate; and
   c. marking the apron with a marking laser beam to produce a pre-selected marking on said apron.

2. The method of claim 1 further comprising directing a shielding gas at the region of the substrate being irradiated by the alloying laser beam used for irradiating said surface.

3. The method of claim 2 wherein said shielding gas is nitrogen or argon.

4. The method of claim 1 wherein said powder comprises chromium or silicon carbide.

5. The method of claim 4 wherein said metallic alloy comprises steel or aluminum.

6. The method of claim 1 wherein the longer sides of the rectangular cross sectional area have a length of at least four millimeters and the shorter sides of said rectangular cross sectional area have a length of at least 0.6 millimeters.

7. The method of claim 1 wherein said marking comprises laser etching.

8. A method for laser marking of metallic alloys, comprising:
   a. applying a layer of precursor comprising a binder and metallic or ceramic powder to a metallic substrate, said layer having a thickness in the range of 50–75 microns; and
   b. aligning a laser with two cylindrical optical elements and one spherical optical element to permit a nonrectangular beam emitted by the laser to be shaped by the optical elements such that a rectangular beam is emitted from the optical element farthest from the laser;
   c. transmitted said nonrectangular laser beam from the laser through the spherical and cylindrical optical elements to produce said laser beam having a rectangular cross-sectional area;
   d. irradiating the surface of the substrate with said rectangular laser beam in a preselected pattern at a sufficient energy level and for a sufficient time to produce a preselected alloyed marking on the substrate having enhanced wear or corrosion resistance.

9. The method of claim 8 further comprising directing a shielding gas at the region of the substrate being irradiated by the laser beam.

10. The method of claim 8 wherein said powder comprises chromium or silicon carbide.

11. The method of claim 8 wherein said metallic alloy comprises steel or aluminum.

12. A method far laser marking of steel or aluminum alloys, comprising:
   a. applying a layer of precursor comprising a binder and metallic or ceramic powder to a steel or aluminum substrate, said layer having a thickness in the range of 50–250 microns;
   b. aligning a nonpulsed laser with two cylindrical optical elements and one spherical optical element to permit a nonrectangular beam emitted by the laser to be shaped by the optical elements such that a rectangular beam is emitted from the optical element farthest from the laser;
   c. transmnitted said nonrectangular laser beam from the laser through the spherical and cylindrical optical elements to produce said laser beam having a rectangular cross sectional area;
   d. irradiating the surface of the substrate with said laser beam having a rectangular cross sectional area at a sufficient energy level and for a sufficient time to produce a corrosion resistant alloyed apron on said substrate while said substrate is moved relative to said laser beam;
   e. directing a shielding gas at the region of the substrate being irradiated by the laser beam; and
   f. marking the apron with a marking laser beam to produce a preselected marking on said apron.

13. The method of claim 12 wherein the aligning is accomplished by placing a spherical lens closest to the laser, a second cylindrical lens closest to the subtrate, and a first cylindrical lens between the spherical lens and the second spherical lens.

14. The method of claim 13 wherein said irradiating is performed at a laser powered density in the range of 45–55 kilowatts/cm$^2$.

15. The method of claim 14 wherein said subtrate is moved relative to said laser beam at a translation rate in the range of 500–9000 millimeters per minute.

* * * * *